Figure 1:
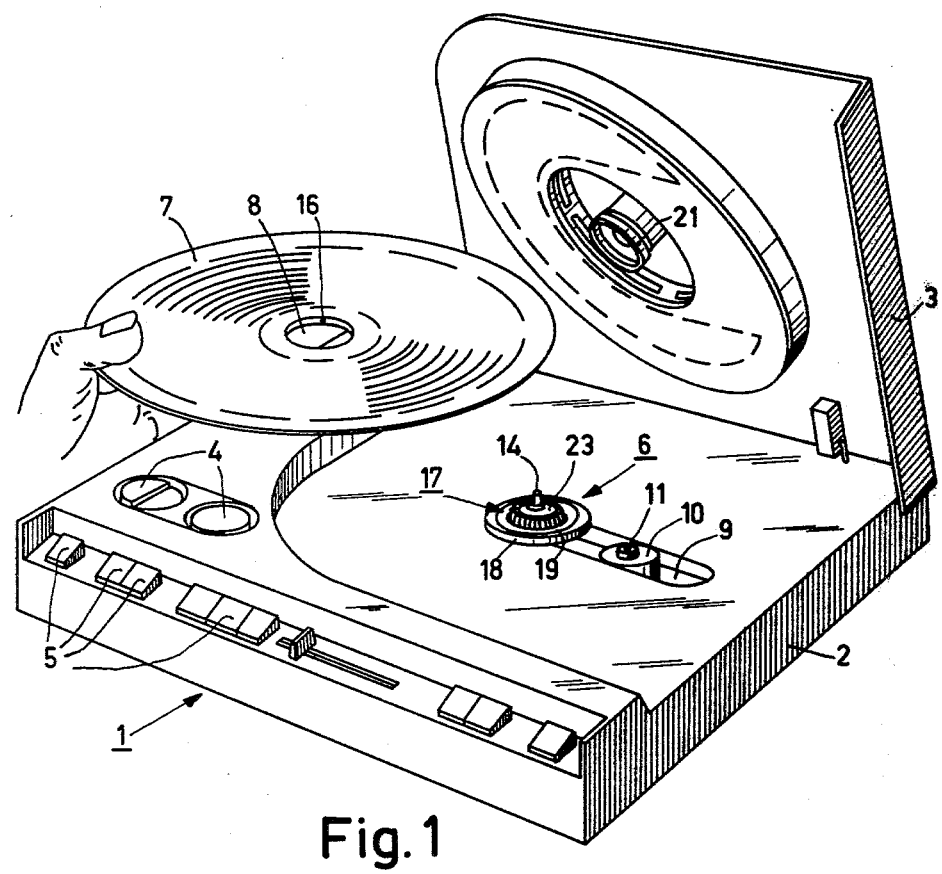

United States Patent [19]

van der Hoek et al.

[11] 4,218,065
[45] Aug. 19, 1980

[54] ARRANGEMENT FOR CENTERING, ALIGNING AND RETAINING A ROTATING RECORD

[75] Inventors: Willem van der Hoek; Eduard Camerik, both of Eindhoven, Netherlands

[73] Assignee: U.S. Philips Corporation, New York, N.Y.

[21] Appl. No.: 972,603

[22] Filed: Dec. 22, 1978

[30] Foreign Application Priority Data

Jun. 5, 1978 [NL] Netherlands .................. 7806072

[51] Int. Cl.² ................. G01D 15/32; G01B 25/04
[52] U.S. Cl. .................................. 274/9 R; 274/39 A
[58] Field of Search ............... 274/9 R, 9 B, 39 R, 274/39 A, 10 D, 10 S; 358/128; 360/97, 98, 99

[56] References Cited

U.S. PATENT DOCUMENTS 3,980,308  9/1976  Camerik et al. .............. 274/39 A X

OTHER PUBLICATIONS

IBM Tech. Disclosure Bulletin, IBM Corp., "Collet Mechanism for Centering etc.", vol. 19 #6 11/76.

Primary Examiner—Harry N. Haroian
Attorney, Agent, or Firm—Thomas A. Briody; William J. Streeter; Simon L. Cohen

[57] ABSTRACT

An arrangement for centering, aligning and retaining a rigid disc such as a rapidly rotating video disc in an operating position, comprising a centering device mounted on a drive spindle, which device cooperates with a central disc hole in the disc, comprising a disc aligner mounted on the drive spindle for aligning the disc in a plane perpendicular to the axis of rotation of the drive spindle in the operating position of said disc, and comprising a disc loader for loading the disc towards the disc aligner. The disc aligner is rigidly connected to the drive spindle and the centering device comprises a plurality of resilient centering members which cooperate with the wall of the disc hole and which are radially movable between a rest position and an operating position which is situated nearer the axis of rotation of the drive spindle.

8 Claims, 8 Drawing Figures

ARRANGEMENT FOR CENTERING, ALIGNING AND RETAINING A ROTATING RECORD

The invention relates to an arrangement for centering, aligning and retaining a rotary rigid disc-shaped record carrier with a central disc hole in an operating position, and relates in particular an arrangement for centering, aligning and retaining an optically readable video disc, the arrangement comprising: a drive spindle with a free end, which spindle is rotatable about an axis of rotation; a centering device disposed on the drive spindle near its free end, which device cooperates with the wall of the central disc hole in the operating position of the disc; a disc-aligner which is mounted on the drive spindle for aligning the disc in its operating position in a plane perpendicular to the axis of rotation of the drive spindle and provided with one or more supporting surfaces for the disc; as well as a disc loader which is movable to a position opposite the centering device and which presses on a disc in the operating position for retaining the disc in position in conjunction with the supporting surfaces of the disc aligner.

Such an arrangement for a video disc player is proposed in U.S. patent application Ser. No. 734,659, filed Aug. 24, 1976 and abandoned in favor of U.S. patent application Ser. No. 47,394, filed June 11, 1979. The centering device of this player comprises a centering member in the form of a centering cone, comprising a truncated cone which is rigidly mounted on the drive spindle. The disc-aligner comprises a flange which rotates along with the drive spindle, but which is axially movable relative to the centering cone and slidably guided on the drive spindle. When a video disc is put on, it is centered relative to the axis of rotation of the drive spindle with the aid of the centering cone. The weight of the video disc causes the disc aligner to be lowered against a slight resilient action until the wall of the disc hole of the video disc makes contact with the centering cone surface. The disc aligner ensures a correct alignement of the video disc at right angles to the axis of rotation of the drive spindle, but does not prevent the wall of the disc hole from engaging with the surface of the centering cone. The disc loader is magnetically urged towards the cone and presses the wall of the disc hole against the surface of the centering cone with such a force that, while the disc aligner also exerts a certain friction on the video disc as a result of the resilient action, a friction torque is produced of a magnitude which suffices for starting, for rotation during operation and for braking the video disc. Unbalance forces as a result of a not entirely uniform mass distribution in the video disc have no influence on the centering accuracy, because the wall of the disc hole remains in contact with the centering cone during operation. Putting on the video disc is a simple operation, because the disc hole is comparatively large and the centering cone has a transverse dimension which varies from smaller than to greater than the disc hole.

A disadvantage of these and similar arrangements for centering, aligning and retaining a disc is that the axial position of the disc on the disc spindle is not predetermined, because in practice the disc-hole diameters of different discs vary. Owing to the comparatively small taper of the centering cone said diameter variations lead to variations in the axial position of the disc on the drive spindle which are approximately 4× as large. A video disc player with discs having an outer diameter of 30 cm and a disc-hole diameter of approximately 35 mm may then cause variations in the axial position of the disc on the drive spindle of approximately 700 microns in total. The variations in disc-hole diameter may be caused by manufacturing tolerances and by influences of the ambient temperature and humidity.

In optical video disc players a most accurate predetermined axial position of the disc on the drive spindle is of importance for two reasons. The first reason is that the read objective should never touch the disc. During operation the objective is disposed at 1½ mm from the rapidly rotating disc surface for the purpose of focussing the read beam. However, in the event of a fault in in the servo control of the objective, damage to this expensive component should be prevented. For this purpose there is provided a stop, which limits the distance over which the objective can move in the direction of the disc. It will be evident that as a result of this the range of permissible deviations of the disc surface in the axial direction is only small. Video discs are not perfectly flat and sag under their weight, in particular near their periphery. These effects contribute to the said deviations in the axial position of the disc surface in such a way that additional contributions as a result of deviations in the diameter of the disc hole should preferably be avoided. A second reason is, that a well-defined axial position on the drive spindle may also be of importance for the stabilization of the disc. Above the rotating surface of the disc there may be disposed a stationary stabilizing disc. The small distance between the rotating disc and the stabilizing disc produces aerodynamic effects which are used for stabilizing the disc and which greatly depend on the distance between the two discs. A less satisfactory stabilization of the disc as a result of an excessive distance between the disc record and the stabilizing disc additionally increases the likelihood of the objective touching the disc record.

Another drawback of the known construction is that for the axial movability of the disc aligner guidance of the disc aligner on the drive spindle is necessary. As a result of the inevitable play in the guidance of the disc aligner a certain residual misalignment in the position of the disc may occur. During operation the video disc rotates with a speed of 25 or 30 Hertz, depending on the system used for coding the information on the disc, so that the residual misalignment manifests itself in a positional inaccuracy which recurs at a rate of 25 or 30 Hertz at the location of the point where the information on the disc is read with the aid of optical means. As during read-out with the aid of optical means the focussing of the light beam which is used should be accurate within 1 μm, there is provided, as previously stated, a servo system for the focussing of the light beam. Thus, the residual misalignment constitutes an additional source of errors for the focussing servo. Moreover, the misalignment contributes to the inaccuracy in the centering of the disc. For the read-out by optical means there is provided a tracking servo, for which the information tracks should preferably be centered with an accuray of better than 50 microns. The residual misalignment may give rise in itself to a centering error of 15 microns.

It is the object of the invention to provide an arrangement of the type mentioned in the preamble, which ensures a correct centering of the disc, even in the case of local irregularities in the wall of the disc hole, and which furthermore guarantees an excellent axial positioning and alignment of the disc. The invention is characterized in that the disc aligner is rigidly connected to the drive spindle, that the centering device comprises a plurality of centering members which are radially movable between a rest position and an operating position which is situated nearer the axis of rotation, and that there are provided resilient means for urging the centering members towards their rest positions, the centering members being movable against the action of the resilient means by cooperation with the wall of the disc hole when the disc is placed onto the drive spindle. The objects pursued are achieved by the invention in that the disc aligner is rigidly connected to the drive spindle and may for example comprise a fixed flange, while the radially movable centering members ensure a correct centering of the disc. Preferably, a multitude of movable centering members are employed, because this minimizes the influence of local irregularities in the disc-hole wall on the centering of the disc, whilst furthermore a comparatively small resilient force is required for each centering member in order to ensure a correct centering of the disc. Thus, plastic deformations of the disc-hole wall are prevented.

An embodiment of the invention which is particularly favorable because many resilient means can be accommodated adjacent each other in the available limited space is characterized in that the resilient means comprise bar springs which are integral with the centering members, which springs are connected to the drive spindle by a fixed end.

A further embodiment is of importance to facilitate placing a disc onto the drive spindle and is characterized in that the bar springs, at least on a side which faces away from the axis of rotation of the drive spindle, have a kinked shape, so that on a side which is disposed nearer the free end of the drive spindle the bar springs together constitute an interrupted truncated cone in the rest position, which cone has a transverse dimension which varies from smaller than to greater than the diameter of the disc hole and furthermore on a side which is more remote from the free end of the drive spindle together constitute an interrupted cylinder in the operating position, which cylinder has a transverse dimension equal to the diameter of the disc hole. As a disc in its ultimate position on the drive spindle is disposed on a cylindrical portion of the centering device, no axial forces will act on the disc in the direction towards the free end of the drive spindle. Consequently, the disc has no tendency to jump off the drive spindle under the influence of the resilient forces.

During operation any imbalance in the video disc gives rise to centrifugal forces on the drive spindle, which should not lead to a radial and axial displacement of the disc. The centrifugal forces which are exerted are taken up by the centering members and by friction forces as a result of the clamping forces between the disc loader and the disc and between the disc and the disc aligner. The supporting surfaces of the disc aligner may consist of a material having a high coefficient of friction. An embodiment of the invention is of importance which is characterized in that the resilient means for the centering members have a spring constant (which is defined as the quotient of the change in resilient force and the change in resilient depression), which upon a displacement of the centering means from the rest position into the operating position changes from smaller to greater. In this embodiment positioning a video disc is initially comparatively easy because of the smaller spring constant, while during operation a higher spring constant ensures that the alignment of the video disc is correct and the centrifugal forces are taken up.

In an arrangement in which the centering members are connected by bar springs it is for example possible to employ an embodiment of the invetion which is characterized in that each bar spring has a free end and that there are provided stop means on the drive spindle with which each of the bar springs cooperates near its free end, in a position situated between the rest position and the operating position, so as to obtain a stepwise change of the spring constant. Owing to the presence of the stops a non-linear spring characteristic is obtained, which is readily compatible with the previously described embodiment of the invention in which a part of the centering device takes the form of an interrupted cone and during operation a part of the centering device takes the form of an interrupted cylinder. The transition from the one portion to the other portion of the spring characteristic may then coincide with the instant at which the spot is reached where during putting on of a video disc the transition appears between the conical portion and the cylindrical portion of the centering device. As near the cylindrical portion the resilient means exert no axial force components on the video disc, the locally higher rigidity of the resilient means while putting on the video disc presents hardly any problems.

From a point of view of manufacturing an embodiment is of interest which is characterized in that the centering device is mounted on the drive spindle as one unit which comprises the bar springs as well as a retaining ring which interconnects said springs and which is integral therewith. Suitably, the centering device is integrally manufactured from a plastics by an injection-moulding process.

In view of an optimum centering of the disc, if bar-shaped springs are used which cooperate with stops so as to obtain a non-linear spring characteristic, an embodiment is of importance which is characterized in that the stop means comprise wall portions of a coaxial cylindrical stop member which is rigidly mounted on the drive spindle. This ensures an optimum centering accuracy.

Figure 2:
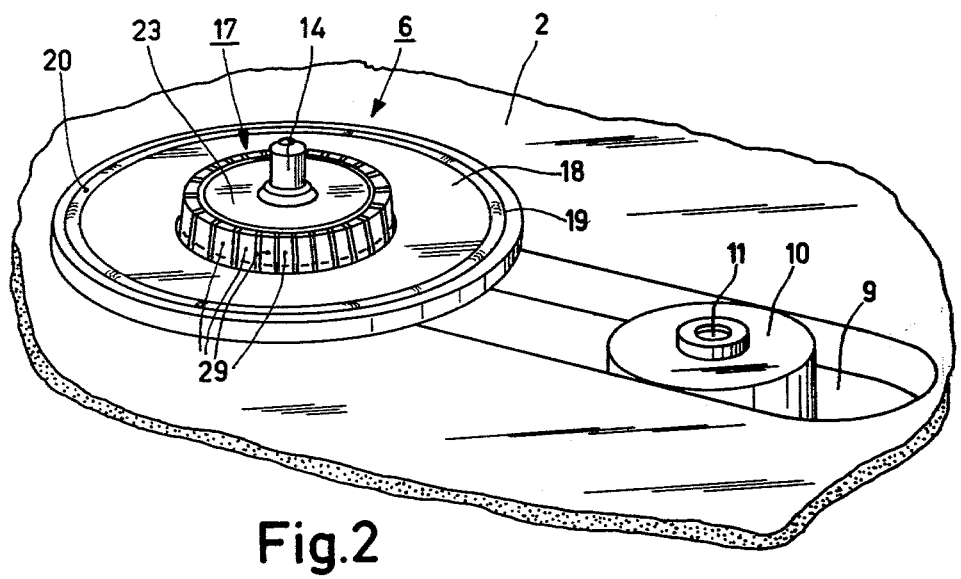
Figure 3:
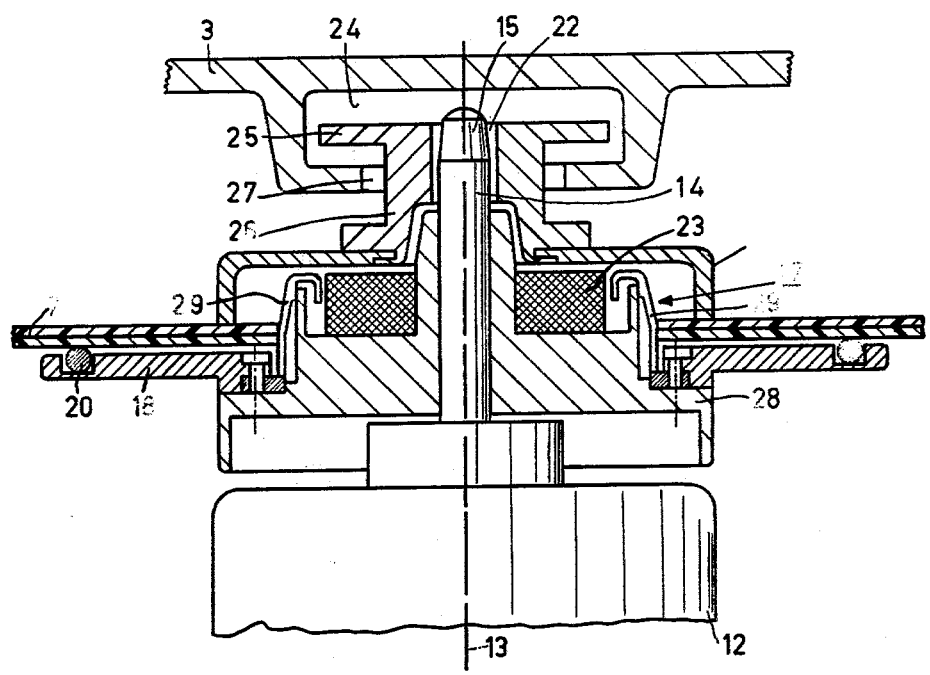
Figure 4:
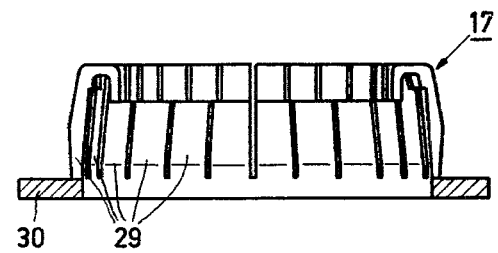
Figure 5A:
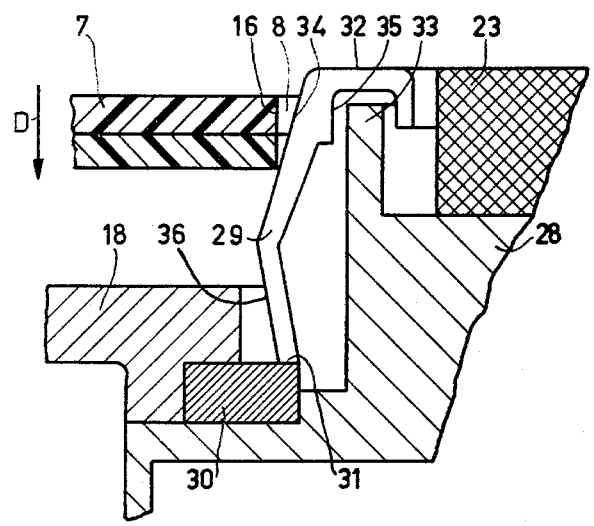
Figure 6:
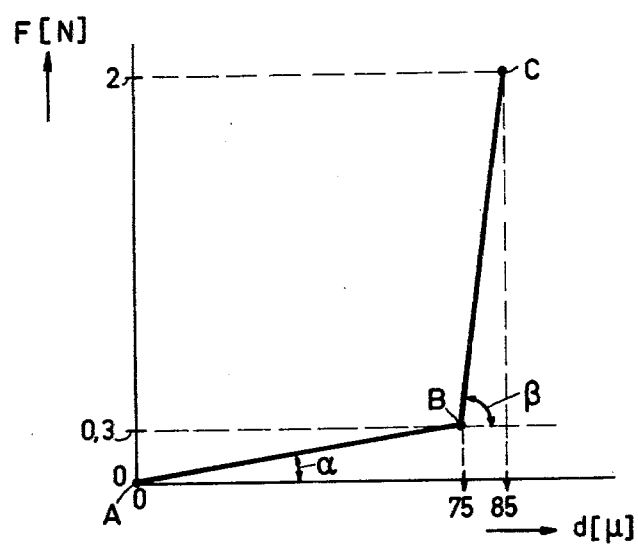

The invention will now be described in more detail with reference to the drawing, in which:

FIG. 1 is a perspective view of a video disc player with open cover and equipped with an arrangement for centering aligning and retaining a video disc, FIG. 2 shows a detail of FIG. 1 on an enlarged scale, FIG. 3 is a partial cross-section over the drive spindle of the video disc in accordance with FIG. 1 when the cover is closed, FIG. 4 is a cross-section of the centering device which is integrally manufactured from a plastic and which is employed in the embodiments shown in the preceding Figures, FIGS. 5A, B and C show a detail of FIG. 3 on an enlarged scale, a video disc being disposed in different positions relative to a centering member in the various Figures, and FIG. 6 represents a spring characteristic of a centering device in accordance with FIG. 4.

In the Figures corresponding parts bear the same reference numerals. The video disc player 1 in FIG. 1 comprises a housing 2 and a hinged cover 3. At the front of the housing there are located a number of buttons 4 and 5 for the actuation of the various apparatus functions. At a central location there is disposed an arrangement 6 for centering, aligning and retaining a video disc 7, which disc has a disc hole 8. The disc can be placed on the arrangement 6 so as to be driven thereby with the required speed of 1500 or 1800 revolutions per minute, depending on whether the power line frequency is 50 or 60 Hertz. Adjacent the arrangement 6 a radially extending slot 9 is formed in the upper surface of the housing 2, in which a focussing device 10 is movable in a radial direction with the aid of means, not shown, which are accommodated in the housing. Said device comprises an objective 11 by means of which a light beam from a laser source, not shown, can be focussed onto the lower surface of a disc which is disposed on the arrangement 6, and with the aid of which the light reflected by the disc can be passed to photoelectric information detection means inside the housing 2.

A drive motor 12, see FIG. 3, has a drive spindle 14 which is rotatable about an axis of rotation 13. The spindle has a slightly truncated free end 15. Near the free end 15 there is disposed a centering device 17 which in the operating position of the disc cooperates with the wall 16 of the central disc hole 8 of the video disc 7. Furthermore, a disc aligner 18 having the shape of a flange is mounted on the drive spindle 14, for aligning the disc 7 in its operating position in a plane perpendicular to the axis of rotation 13 of the drive spindle 14. The disc aligner 18 has a supporting surface for the video disc 7 in the form of a hard-rubber ring 20 which is disposed in an annular groove 19. The cover 3 carries a disc loader 21 which is movable to a position opposite the centering device 17 and which in the operating position presses on the video disc 7 for loading the disc in the direction of the ring 20 of the disc aligner 18 and thus retaining said disc. With the aid of a bore 22 the disc loader 21 loosely engages the drive spindle 14 and cooperates with a disc-shaped permanent magnet 23 mounted on the drive spindle. The cover 3 has a chamber 24 which receives a flange-shaped portion 25 of the disc loader with play, while a cylindrical portion 26 of the disc loader projects through an opening 27 of the chamber 24. Thus, when the cover 3 is closed the disc loader can rotate freely along with the drive spindle 14. When the cover is opened the disc loader is withdrawn from the drive spindle by means of the flange 25.

The permanent magnet 23 as well as the flange 18 are connected to a member 28 which has been shrunk on the drive spindle 14, and they are thus rigidly connected to the drive spindle. The centering device 17 comprises a plurality of centering members 29 which are radially movable between a rest position (see FIG. 5A) and an operating position (see FIG. 5C) which is situated nearer the axis of rotation 13. Said centering members take the form of bar springs, which are connected to the drive spindle with a fixed end and, together with a retaining ring 30, constitute a single component manufactured from a plastic by injection mounting, see FIG. 4. A suitable material is for example polycarbonate with an addition of 1% silicon oil in order to reduce the coefficient of friction. The centering members 29 are movable against their resilient action by cooperation with the wall 16 of the disc hole 8 in the video disc 7 when said disc is placed onto the drive spindle.

The bar springs 29 have a kinked shape at least at their sides which are remote from the axis of rotation 13 of the drive spindle 14, so that in the rest position at their sides nearer the free end of the drive spindle the bar springs together constitute an interrupted truncated cone which has a transverse dimension which varies from smaller than to greater than the diameter of the disc hole 8 of the video disc 7 and in the operating position at their sides which are more remote from the free end 15 of the drive spindle constitute an interrupted cylinder with a transverse dimension equal to the disc-hole diameter. This will be explained hereinafter with reference to FIGS. 5A to 5C.

The centering members 29 have a spring constant which during the movement of the centering means from the rest position into the operating position changes from smaller to greater.

Figure 5B:
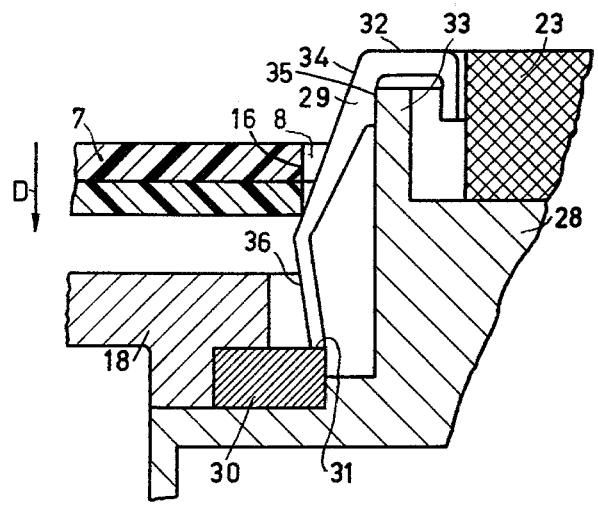
Figure 5C:
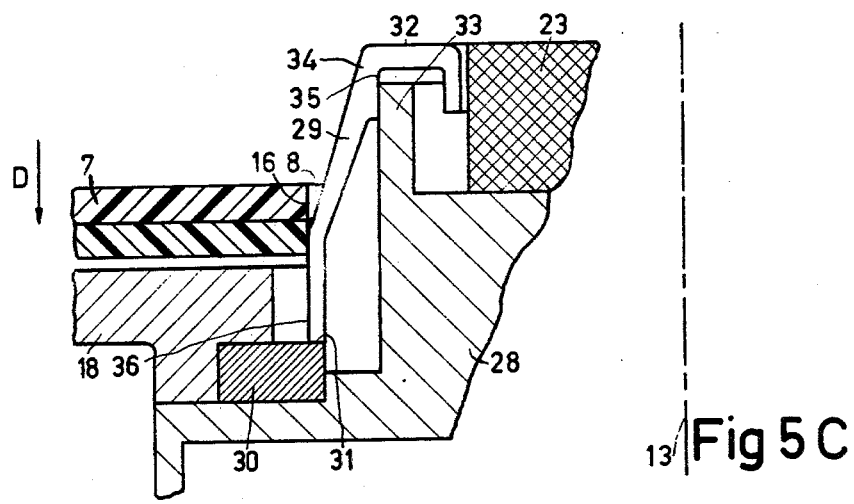

FIGS. 5A to 5C show how a centering member 29 is moved from its rest position to its operating position when the video disc 7 is put on. Each of the centering members has a fixed end 31 which is connected to the retaining ring 30 and a free end 32 on the opposite side. This free end is hook-shaped and engages with a stop means 33 which forms part of the member 28 which has been shrunk onto the drive spindle 14. FIG. 5A represents the situation in which the wall 16 of the disc hole 8 of the video disc 7 just contacts the portion 34 of the centering member 29 in that the video disc is moved downwards in the direction of the arrow D. The portions 34 together constitute the previously mentioned interrupted cone. During a further downward movement in the direction of the arrow D the centering member 29 is moved in the direction of the axis of rotation 13 of the drive spindle under the influence of the cooperation of the wall 16 of the disc hole with said centering member until the position of FIG. 5B is reached, a stop edge 35 just making contact with the stop means 33. Between the position of the centering member 29 shown in FIGS. 5A and 5B said member pivots about its fixed end 31. However, once the situation of FIG. 5B is reached, further pivoting of the centering member is no longer possible owing to the cooperation of the stop portion 35 of the centering member 29 with the stop means 33. The graph of FIG. 6 shows how a pivotal force F acting on the centering member 29 in the direction of the axis of rotation 13 varies between the situations represented in FIGS. 5A and 5B. In point A of the graph, which corresponds to the situation in FIG. 5A, the force F is obviously zero. In point B the situation of FIG. 5B is obtained and the force is 0.3 Newtons after a displacement d of 75 microns. The spring constant, which is defined as the quotient of the force F in Newtons divided by the displacement d in microns, equals tan $\alpha$ over the entire path between points A and B. Starting from the situation in FIG. 5B the situation of FIG. 5C is ultimately reached by further displacement of the disc 7 in the direction D, because the disc 7 will engage with the ring 20 in the flange 18. The deformation to which the centering member 29 is then subject demands a greater force in the direction of the axis of rotation 13, so that the required force F between points B and C in the graph of FIG. 6 increases from 0.3 to 2 Newtons for a displacement of 10 microns. In this range the spring constant is tan $\beta$. During this last part of the displacement of the disc 7 the wall 16 of the disc hole 8 moves from the portion 34 to the portion 36 of the centering member 29. The surfaces 36 of the centring members 29 together constitute an interrupted cylinder in the situation of FIG. 5C. A correct centering of the disc on the centering device is obtained by the cooperation of the wall 16 with the portion 36 of the centering members 29, said interrupted cylindrical surface being concentrically disposed relative to the axis of rotation 13. The accuracy of this concentricity is promoted by the cylindrical shape of the stop means 33, which constitutes a cylindrical stop member, which is rigidly and coaxially mounted on the drive spindle, for all centering members 29.

Although in the foregoing only one embodiment of the invention has been described, the scope of the invention also includes different embodiments which are based on the same inventive principle. Thus, it is possible within the scope of the invention to use different centering members, for example in the form of balls or pins which are radially movable in bores or slots, which balls or pins are radially pressed outwards by means of suitable springs.

What is claimed is:

1. An improved arrangement for centering, aligning and retaining a rotary disc-shaped rigid record with a central disc hole in an operating position, the arrangement comprising:

a drive spindle with a free end, which spindle is rotatable about an axis of rotation, a centering device disposed on the drive spindle near its free end, which device cooperates with a wall of the central disc hole in the operating position of the disc, a disc aligner which is mounted on the drive spindle for aligning the disc in its operating position in a plane perpendicular to the axis of rotation of the drive spindle and provided with one or more supporting surfaces for the disc, as well as a disc loader which is movable to a position opposite the centering device and which presses on a disc in the operating position, for retaining the disc in position in conjunction with the supporting surfaces of the disc aligner, the improvement being characterized in that the disc aligner is rigidly connected to the drive spindle, the centering device comprises a plurality of centering members which are radially movable between a rest position and an operating position which is situated nearer the axis of rotation, and there are provided resilient means for urging the centering members towards their rest positions, the centering members being movable against the action of the resilient means solely by cooperation with the wall of the disc hole when the disc is placed onto the drive spindle and axially moved toward its operating position.

2. An arrangement as claimed in claim 1, characterized in that the resilient means for the centering members comprise bar springs which are integral with the centering members, which springs are connected to the drive spindle by a fixed end.

3. An arrangement as claimed in claim 2, characterized in that the bar springs, at least on a side which is remote from the axis of rotation of the drive spindle, have a kinked shape, so that on a side which is disposed nearer the free end of the drive spindle the bar springs together constitute an interrupted truncated cone in the rest position, which cone has a transverse dimension which varies from smaller than to greater than the diameter of the disc hole, and furthermore on a side which is more remote from the free end of the drive spindle together constitute an interrupted cylinder in the operating position, which cylinder has a transverse dimension equal to the diameter of the disc hole.

4. An arrangement as claimed in claim 1, characterized in that the resilient means for the centering members have a spring constant, (which is defined as the quotient of the change in resilient force and the change in resilient depression, which upon a displacement of the centering means from the rest position into the operating position changes from smaller to greater.

5. An arrangement as claimed in claim 2, characterized in that each bar spring has a free end and that there are provided stop means on the drive spindle with which, in a position situated between the rest position and the operating position, each of the bar springs cooperates near its free end, so as to obtain a stepwise change of the spring constant.

6. An arrangement as claimed in claim 2, characterized in that the centering device is mounted on the drive spindle as one unit, comprising the bar springs as well as a retaining ring which interconnects said springs and which is integral therewith.

7. An arrangement as claimed in claim 6, characterized in that the centering device is integrally manufactured from plastic.

8. An arrangement as claimed in claim 5, characterized in that the stop means comprise wall portions of a coaxial cylindrical stop member which is rigidly mounted on the drive spindle.

* * * * *